United States Patent
Delmas et al.

(10) Patent No.: US 12,202,949 B2
(45) Date of Patent: Jan. 21, 2025

(54) METHOD FOR TREATING A POLYMER PART IN ORDER TO MODIFY ITS ROUGHNESS AND/OR TO FUNCTIONALISE IT

(71) Applicant: COMMISSARIAT À L'ÉNERGIE ATOMIQUE ET AUX ÉNERGIES ALTERNATIVES, Paris (FR)

(72) Inventors: Jérôme Delmas, Grenoble (FR); Philippe Capron, Grenoble (FR); Marlène Chapuis, Grenoble (FR); Xavier Gasso Puchal, Sant Cugat del Vallé (ES); Olivier Poncelet, Grenobel (FR); Isabelle Rougeaux, Grenoble (FR)

(73) Assignee: COMMISSARIAT À L'ÉNERGIE ATOMIQUE ET AUX ÉNERGIES ALTERNATIVES, Paris (FR)

( * ) Notice: Subject to any disclaimer, the term of this patent is extended or adjusted under 35 U.S.C. 154(b) by 571 days.

(21) Appl. No.: 17/595,694

(22) PCT Filed: May 22, 2020

(86) PCT No.: PCT/EP2020/064304
§ 371 (c)(1),
(2) Date: Nov. 22, 2021

(87) PCT Pub. No.: WO2020/239630
PCT Pub. Date: Dec. 3, 2020

(65) Prior Publication Data
US 2022/0220269 A1    Jul. 14, 2022

(30) Foreign Application Priority Data
May 24, 2019   (FR) ...................... 1905530

(51) Int. Cl.
C08J 7/02 (2006.01)
B29C 71/00 (2006.01)
C08J 7/04 (2020.01)
C08J 7/044 (2020.01)
C08J 7/05 (2020.01)
C08J 7/06 (2006.01)

(52) U.S. Cl.
CPC .............. *C08J 7/02* (2013.01); *B29C 71/0009* (2013.01); *C08J 7/0427* (2020.01); *C08J 7/044* (2020.01); *C08J 7/05* (2020.01); *C08J 7/065* (2013.01); *C08J 2377/00* (2013.01); *C08J 2377/02* (2013.01); *C08J 2400/12* (2013.01); *C08J 2443/02* (2013.01); *C08J 2465/00* (2013.01)

(58) Field of Classification Search
CPC . C08J 7/02; C08J 7/044; C08J 2377/02; C08J 2400/12; C08J 2443/02; C08J 7/0427; C08J 7/05; C08J 7/065; C08J 2377/00; C08J 2465/00; B29C 71/0009
See application file for complete search history.

(56) References Cited

U.S. PATENT DOCUMENTS

2010/0133477 A1   6/2010   Jikei et al.

FOREIGN PATENT DOCUMENTS

| EP | 3587092 A1 | 1/2020 |
|---|---|---|
| FR | 3056122 A1 | 3/2018 |
| FR | 3056146 A1 | 3/2018 |

OTHER PUBLICATIONS

International Search Report for PCT/EP2020/064304 dated Jul. 29, 2020 and translation thereof.
Written Opinion for PCT/EP2020/064304 dated Jul. 29, 2020 and translation thereof.
Search report for French application No. FR1905530 dated Jan. 21, 2020.

*Primary Examiner* — Rabon A Sergent
(74) *Attorney, Agent, or Firm* — Pearne & Gordon LLP

(57) ABSTRACT

A method for treating a polymer part comprising a step of bringing the part into contact with vapours of solvent(s), capable of at least partially solubilising the part, this contacting step being carried out under vacuum. Application of this method for modifying the roughness of the part and/or functionalising it.

12 Claims, 4 Drawing Sheets

METHOD FOR TREATING A POLYMER PART IN ORDER TO MODIFY ITS ROUGHNESS AND/OR TO FUNCTIONALISE IT

CROSS-REFERENCE TO RELATED APPLICATIONS

This is a National Stage application of PCT international application PCT/EP2020/064304, filed on May 22, 2020, which claims the priority of French Patent Application No. 1905530 filed May 24, 2019, both of which are incorporated herein by reference in their entirety.

TECHNICAL FIELD

The present invention relates to a method for treating a polymer part by specifically exposing said part to vapours of solvent(s), this method having the purpose of modifying the surface roughness of said part and/or functionalising said part with at least one material of interest by adhering material to the surface of the part or by integrating material into said part by encapsulating the latter.

The invention can be applied to the production of polymer parts having new properties compared to their original properties, these new properties being conferred by modifying the surface roughness and/or the functionalisation, these new properties being for example anti-reflective, dirt-repelling, adhesive or non-adhesive, hydrophilic, hydrophobic, oleophilic, oleophobic, antibacterial, anti-counterfeiting, anti-icing, anti-scratch, flame retardant, electric charge dissipating properties, cleanable, anti-aging, colouring, frictional, sliding, electrically conductive properties, the doping or cross-linking of polymers.

PRIOR ART

The treatment of parts made from polymer material by exposing them to solvent vapours has already been the subject-matter of numerous developments, particularly with a view to degreasing or polishing these parts.

Such a treatment consists of immersing the part to be treated in a medium comprising the solvent which has been brought to boiling point. In a known manner and mentioned briefly here, the physical method used for the interaction between a solvent in the gaseous state and a part made of polymer material, consists of the absorption of the solvent miscible with the polymer, until the equilibrium of chemical potentials is achieved. More precisely, the process of solvent absorption is performed in a sequence of two distinct steps, the first step consisting of the penetration of the solvent into the surface area which is solubilised by the action of the solvent, and the second step relating to the diffusion of the solvent towards the core of the sample in the direction of the solvent concentration gradient in the part. The adsorption process may be dependent on the rate of condensation of the vapour phase into liquid and may be facilitated by adding electrostatic charges to the vapour phase.

The two main primary consequences of the absorption of solvents are the plasticisation and swelling of the polymer part. In the transitory sorption process, a solvent concentration gradient is established within the thickness of the part. The surface layer tends to swell during the absorption, but its expansion in the plane of the surface is blocked by its adhesion to the non-swollen core.

During the exposure to solvent vapours, the physicochemical properties of the surface layer are modified, including reducing its viscosity. After exposure to the solvent vapours, the part is plasticised.

This exposure to solvent vapours is used in particular to reduce the surface roughness of a polymer part. The physical principle used consists of condensing the vapours of a solvent with satisfactory solubility parameters on the surface of the part. In practice, this consists of bringing the polymer part into contact in the same enclosure at a temperature referred to as "cold" (i.e. lower than or equal to ambient temperature) and solvent vapours at a temperature referred to as "hot" (several tens of degrees Celsius) from a boiling liquid bath. This vapour treatment phase may possibly be combined with additional surface treatment steps of an abrasive type.

However, the implementation of this type of method generally leads to problems regarding the homogeneity of treatment of the part, whose surface may turn out to be irregular, even marred by defects such as cracking. The heterogeneity of the end result is due to a difference in penetration and dispersion of the molecules penetrating the polymer matrix.

Alternatively and in an attempt to find a solution to the aforementioned disadvantages, in the prior art methods have been proposed for treating a polymer part which no longer rely on a temperature differential between the part to be treated and the solvent vapours capable of creating surface heterogeneity, an example of such a method is described in FR 3056146.

To achieve this, it is intended to implement this method in a device comprising an enclosure which surrounds the substrate to be modified in an upper area and a container comprising the solvent in liquid form (before vaporisation) in a lower area, said device comprising means for regulating the temperature over the entire wall of the enclosure so as to reduce advantageously the presence and harmful consequences of this temperature gradient and also comprising a mixer so as to achieve greater homogeneity of the concentration of the solvent vapours in the enclosure and thus around the part to be treated. The method described in FR 3056146 comprises the following steps:

a step of controlling the system for regulating the temperature, in such a way as to bring the temperature of the enclosure and of the part to a treatment temperature greater than or equal to the boiling temperature of the solvent;

a step of exposing the part to be treated to solvent vapours, in the enclosure at the treatment temperature; and during the exposure of the part to be treated to solvent vapours, a step of actuating the gas mixer.

A variant of this method is described in FR 3056122, where the polymer substrate to be modified is previously covered with a film of solid particles, the exposure to solvent vapours generated by heating serving to fix the particles on the polymer substrate.

In both methods described in FR 3056146 and FR 3056122, the solvent vapours are produced by heating in an enclosure comprising the substrate to be treated.

Furthermore, in FR 3056122, the method described has the following limitations:

for functionalising polymer substrates it requires the implementation of sequential steps, including a preliminary step of contacting the substrate with a film of solid particles (intended to ensure functionalisation) before the contacting step with solvent vapours;

the solid particle film used for functionalising the polymer substrate retains its morphology after exposure to the solvent vapours, which contribute to the surface modification of the substrate, which makes it possible to fix the film of particles in its original morphology;

at the end of the method, the particle film fixed to the substrate is not encapsulated therein, due to the fact that the action of the solvent vapours only acts on the surface of the polymer substrate.

The authors of the present invention propose to provide a method for treating a polymer part which does not have the limitations of the methods mentioned below.

DESCRIPTION OF THE INVENTION

Thus, the invention relates, in a general manner, to a method for treating a polymer part comprising a step of bringing said part into contact with vapours of solvent(s), capable of at least partly solubilising said part, this contacting step being carried out under vacuum.

More specifically, the invention relates to a method for treating a polymer part, which is a method for modifying the surface roughness of said polymer part and functionalising said polymer part, comprising a step of bringing said part into contact with vapours of solvent(s), capable of at least partly solubilising said part, this contacting step being carried out under vacuum and comprising, before the contacting step or after the contacting step, a step of depositing at least one functionalising material over all or part of the part, the functionalising material(s) being electrically conductive polymers and/or organophosphorus polymers.

A polymer part, is specified as part of a material comprising one or more polymers, which does not exclude this material containing other ingredients which are not polymers, such as inorganic carbon materials (for example, carbon black).

By carrying out this step of contacting under vacuum, it is thus possible to achieve the following advantages:
- the possibility of obtaining and/or maintaining the solvent (s) in the form of vapours without heating (i.e. at ambient temperature), which is a substantial energy saving compared to the methods of the prior art, in which the vapours of solvent(s) are obtained by heating;
- the possibility of achieving a deeper surface modification of the part due to better solubilisation of the surface of the latter, which makes it possible in particular at the end of the method to obtain a part with even less roughness and also to obtain a given roughness value depending on the duration of the contacting step;
- the possibility, during the treatment of the part of functionalising with by another material, to go as far as integrating this other material within the polymer part, which confers maximum adhesion of the other material compared to standard deposition techniques;
- the possibility, when the treatment of the part consists of functionalising with another material and this other material is also able to be solubilised by the solvent vapours, of a very deep integration of this other material into the polymer part.

Furthermore, the method of the invention also makes it possible to achieve the following advantages:
- excellent precision, as it does not affect the dimensions of the treated parts and allows perfect preservation of the geometry of the parts and maintenance of the 3D reliefs without smoothing sharp angles and any minor details, if necessary, the dimensional variation after treatment not exceeding 30 µm;
- a homogenous colour of the treated parts and in particular no formation of spots or white areas from the precipitation of polymer(s) even when the parts also contain carbon materials, such as carbon black;
- a method that can be easily industrialised, including a small number of steps, that can be carried out at ambient temperature, that does not require large quantities of products (which is an advantage with the use of vapours of solvent(s) compared to immersion techniques in a liquid solvent) and that allows the simultaneous treatment of several parts;
- no previous preparation of the surface of the parts to be treated.

Lastly, the use of solvent vapours for the implementation of the method of the invention has the following advantages:
- the reduction of quantities of solvent(s) used compared to techniques involving liquid methods;
- the non-aggressiveness of vapours with respect to the parts to be treated, the geometry of the parts remaining unchanged;
- the possibility of treating all the complex reliefs of the parts, if necessary.

The general principle of the present invention is thus based on the surface solubilisation of a polymer part by means of the action of solvent vapours under vacuum. Without being bound by theory, on contact with vapours of solvent(s) and in a vacuum atmosphere, the macromolecular chains of the polymer(s) constituting the part located on the surface of the latter separate and surround themselves with molecules of solvent(s), thus causing a swelling of the surface of the part, the thus swollen part being comparable to a gel.

The formation of a gel on the surface of the polymer part can thus:
- after drying and evaporating the solvent(s), allow a smooth and homogenous layer to be obtained on the surface of the part, which means in other words that the part can have less roughness than in its original state (i.e. its state before contacting with the vapours of solvent(s));
- if the treatment consists of functionalising the part, trap and/or encapsulate at least one functionalising material, this trapping and/or this encapsulation occurring concomitantly with a decrease in roughness of the part, the functionalising material(s) being able to be covered by a layer of polymer(s) constituting the part;
- if the treatment consists of a functionalisation of the part but at a lower level of integration than in the previous point, significantly improve the adhesion between the part and the functionalising material(s).

This contacting step of the part with the vapours of solvent(s) is carried out under vacuum and, more specifically, so that the residual pressure during this step is 100 mbar to 200 mbar, particularly when the temperature of the contacting step corresponds to ambient temperature. If the contacting step is carried out by heating at a temperature higher than ambient temperature, the residual pressure can reach 500 mbars.

This contacting step can be maintained for a time period necessary to achieve the surface modification of the desired part, knowing that the longer the contacting step is maintained, the greater the surface modification.

This contacting step can be carried out at ambient temperature (i.e. without heating) but can also be carried out by working at temperatures higher than ambient temperature. Indeed, by using a temperature higher than ambient temperature while using a vacuum, it can be possible to more rapidly achieve the saturating vapour pressure of the solvent (s), to improve the homogeneity of the vapour phase and also increase the solubilisation kinetics of the polymer(s) constituting the part.

After the contacting step, the method comprises advantageously, a step of stopping the exposure of the part to vapours of solvent(s).

Furthermore, the method may comprise, preferably after this stopping step, a step of removing the solvent(s) present in the part obtained at the end of the contacting step.

Specifically, this step of stopping the exposure can consist of extracting the vapours of solvent(s) from the medium where the contacting step is taking place, for example an enclosure under vacuum. In this specific case, the extraction can be carried out by adding air to the enclosure.

As for the elimination step, it consists generally of extracting the solvent(s) from the treated part, this elimination can be carried out by:

heating the part (in particular, to a temperature higher than the boiling temperature of the solvent(s));
subjecting the part to a vacuum atmosphere (preferably, this time without the present of vapours of solvent(s)); and/or
applying a scanning loop for recondensing the solvent(s) trapped in the part (for example, by means of a cold trap).

In particular, the elimination can be carried out by linking the heating of the part with subjecting the part to a vacuum atmosphere.

The elimination can be completed by washing the part so as to eliminate residual traces of solvent(s). The elimination of solvent(s) from the treated part also contributes to preserving a homogenous colour of the treated part. Indeed, the remaining presence of solvent(s) can favour the precipitation of the polymer on the surface of the part and lighten its colour (either homogenously or heterogeneously with white areas).

The polymer part to be treated according to the method of the invention may comprise one or more polymers selected from polyamides (such as polyamide 12), polyurethanes, polycarbonates, poly(meth)acrylates (such as poly(methyl) methacrylates), polysulfones (such as polyphenyl sulfones), polyolefins (such as polyethylenes, polypropylenes, COCs (abbreviation of the term Cyclic Olefin Copolymer)), styrenic polymers (such as polystyrenes, ABSs), polyethers (such as polyphenylene ethers), poly(meth)acrylics, polyoxazolines (such as poly(2-ethyl-2-oxazoline), polyacetates (such as polyvinyl acetates) and mixtures thereof.

In particular, the polymer part may be based on a polyamide, such as polyamide 12.

Furthermore, the polymer part to be treated may be amorphous, semi-crystalline or even have a highly crystalline structure.

Lastly, the polymer part to be processed may be a 3D printed part.

The solvent or solvents used for the processing method of the invention are selected from volatile solvents with a vapour density greater than air, and preferably selected from halogenated solvents (such as chloropropane, chloroform, dichloromethane, 1-bromopropane, perchloroethylene, trichloroethylene, methylene bromide, 1-chloropropane), aromatic solvents (such as xylene, toluene, benzene), ketonic solvents (such as acetone, methyl ethyl ketone), possibly halogenated alcoholic solvents (such as ethanol, methanol, hexafluoroisopropanol), acids (such as nitric acid, formic acid, phosphoric acid) (which acids may exist in the form of aqueous solutions) and mixtures thereof.

It is understood that the choice of solvent(s) will be dictated by the nature of the polymer part, the solvent(s) selected having to be capable of solubilising it at least on the surface so as to form a gel on the surface of said part. An appropriate choice can easily be made by the person skilled in the art, in particular after carrying out preliminary tests, for a given polymer part, with different solvents to determine the most effective solvents for said polymer part.

In particular, when the polymer part is based on polyamide 12, a particularly suitable solvent for carrying out the method of the invention is hexafluoroisopropanol.

As mentioned above, the treatment method of the invention can be, more specifically, a method for modifying the roughness of the surface of the polymer part (and more precisely, reducing the roughness of the surface of the polymer part), and may possibly also be a method for functionalising the polymer part with at least one functionalising material.

A plurality of variants may be envisaged, particularly when the treatment method is intended for functionalising a polymer part.

According to a first variant, prior to the contacting step, the polymer part may already be provided on all or part of its surface with at least one functionalising material (for example in the form of a film comprising at least one functionalising material, such as a film of particles of at least one functionalising material), the method of the invention thus comprising, before the depositing step, a step of depositing over all or part of the surface of the polymer part at least one functionalising material (for example in the form of a film, such as a film of particles), this depositing step may be carried out by standard depositing techniques (such as spraying, screen printing).

According to a second variant, at the same time as the contacting step, the method of the invention can comprise a step of depositing over all or part of the surface of the polymer part at least one functionalising material (for example, in the form of a film), whereby the functionalising material(s) are integrated into the gel formed on the surface of the part as a result of the action of the vapours of solvent(s) and subsequently, after drying the gel, are integrated into the polymer part.

According to a third variant, the vapours of the solvent(s) used during the contacting step also comprise at least one functionalising material, which means in other words that the contacting step of the polymer part is performed with vapours of solvent(s), which also comprise at least one functionalising material, this or these functionalising materials being thus directly integrated into the gel formed following the contact of these vapours with the polymer part.

Lastly, according to a fourth variant, after the contacting step, the method of the invention can comprise a step of depositing at least one functionalising material over all or part of the surface of the polymer part, the functionalising material(s) being integrated into the gel formed on the surface of the part as a result of the action of the vapours of solvent(s) and subsequently, after drying the gel, are integrated into the polymer part.

When the treatment method is intended to functionalise the polymer part, the solvent(s) used, in addition to their ability to solubilise the part at least partly, may be capable of solubilising the functionalising material(s), which may make it possible, particularly in the case of the first variant, to modify the initial morphology of the functionalising material(s) deposited previously.

The functionalising material(s) may be materials which are intended to modify the properties of the part to be treated and in particular may be polymers different from those constituting the part to be treated, and more specifically:

electrically conductive polymers, such as conductive polymers of the PEDOT type and more specifically a PEDOT:PSS mixture (PEDOT an abbreviation of poly (3,4-ethylenedioxythiophene and PSS an abbreviation of sodium polystyrene sulfonate), in particular to improve the electronic conductivity of the part; and/or organophosphorus polymers, in particular for improving the fire resistance of the part.

The method of the invention may be carried out in a device comprising an enclosure designed to receive the part to be treated and the vapours of solvent(s), means for controlling the pressure of said enclosure for applying a vacuum to the latter (for example, via a vacuum pump communicating with the enclosure).

The device may also comprise:

a container disposed in the enclosure and intended to receive the solvent(s) in a liquid state prior to the transformation of the latter into vapours;
  a mixer which makes it possible to obtain greater homogeneity of the concentration of the vapours of solvent(s) in the enclosure and therefore around the part to be treated and to renew the gas-liquid interface effectively, this mixer may be a magnetic bar or a fan (in this latter case, the fan is arranged preferably between the container of the solvent(s) in a liquid state and the part to be treated, in the direction of the height of the enclosure);
  a heating system for obtaining, in combination with placing under vacuum, vapours of solvent(s) and reducing the treatment time;
  a venting system, which is controllable for example, making it possible to vent the enclosure, in particular for putting the enclosure under air (so as to cut off the vacuum to stop the exposure of the part to be treated to vapours of solvent(s)); and/or
  means for supporting the part to be treated.

The pressure control means, in addition to the initial placing under vacuum to obtain the vapours of solvent(s), can be used to recondense the vapours of solvent(s) once the treatment is complete and thereby remove the solvent(s) in liquid phase from the reactor and/or extract the solvent(s) from the part once the latter has been treated (for example, by replacing the enclosure under vacuum).

The vapours of solvent(s) can be obtained:

by placing a liquid source of the solvent(s) present in the device under vacuum;
  by injecting the solvent(s) into the device previously placed under vacuum (the solvent(s) thus vaporising immediately, any excess of injected solvent being condensed);
  by direct injection of the vapours of solvent(s) into the device already under vacuum.

Other advantages and features of the invention will be given in the following detailed description which is not limiting in any way.

DETAILED DESCRIPTION OF PREFERRED EMBODIMENTS

Example 1

Figure 1:
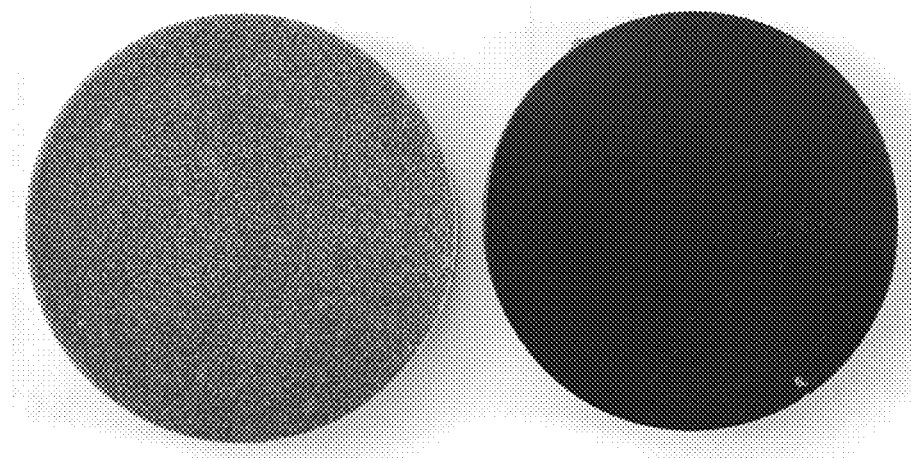
FIG. 1 shows two photographs of the part before treatment (left part) and the part after treatment (right part) according to the modalities of example 1 below.

This example illustrates the use of the treatment method of the invention to demonstrate the effectiveness of the latter in reducing the roughness of a part comprising polyamide 12 made by 3D printing.

The part to be treated is a disc with a thickness of 5 mm and diameter of 5 cm produced by 3D printing, this part being made from a material comprising polyamide 12 and carbon black having an initial roughness (before treatment) on its first face of 8.2 μm and an initial roughness (before treatment) on its second face (opposite the first face) of 15.4 μm.

The treatment process is carried out in a reactor-type device and, more specifically, an airtight glass reactor having an internal volume of 900 mL consisting of two parts: a container and a lid held together by silicon grease. A glass crystalliser of 5 cm diameter with a magnetic bar is disposed in the lower part of the reactor and is designed to receive the liquid solvent prior to vaporisation. The reactor is placed on a magnetic stirrer and the reactor lid is connected to a diaphragm vacuum pump.

The following steps are implemented in succession:

the solvent hexafluoroisopropanol (10 g) is placed in the crystalliser;
  b) the part to be treated is placed and held in the upper part of the reactor by means of a metal support, such that it is about 5 cm above the level of the solvent placed in the crystalliser;
  c) the reactor is closed by positioning the lid on the container and sealing the lid and the container by means of silicon grease;
  d) the solvent placed in the crystalliser is subjected to sufficient but not too much magnetic agitation (800 rpm) to avoid any direct projections on the part;

e) the reactor is placed under vacuum so that the residual pressure is 100 mbar then isolated once this residual pressure has been reached (maintenance of static vacuum);
f) the contact time between the part and the solvent vapours is measured from the moment the value of 100 mbar is reached in the reactor;
g) after 20 minutes of treatment, the reactor is depressurised;
h) the reactor is open and the part is removed;
the removed part is then placed in a circulating air oven at a temperature of 60° C. for 5 minutes;
j) the part is then washed in a 600 mL beaker containing 500 mL water under agitation (800 rpm) for 10 minutes;
k) the part is left in the open air for a few minutes to evaporate the water;
l) the part can then be manipulated.

According to a first variant, from step h), the subsequent steps may be as follows:
the part is placed in an air circulation oven at a temperature of 60° C. for 30 minutes;
j) the part can then be manipulated.

According to a second variant, from step f), the subsequent steps may be as follows:
g) after 20 minutes of treatment, the reactor is kept under vacuum (dynamic vacuum) for 20 minutes;
h) the reactor is depressurised;
the reactor is opened and the part is removed;
k) the part is placed in a circulating air oven at a temperature of 60° C. for 5 minutes;
l) the part can then be manipulated.

After the treatment, the parts obtained have a roughness of 1.6 μm on the first face and a roughness of 2.4 μm on the second face.

An example of a part before treatment and a part after treatment are represented in photographic form for the part before treatment (left part) and for the part after treatment (right part) in the accompanying FIG. 1 attached. The right part shows a part with a smooth surface compared to the left part showing a part with a rough surface.

The method of treatment according to the invention is therefore extremely effective in reducing the roughness of a polymer part.

Figure 2:
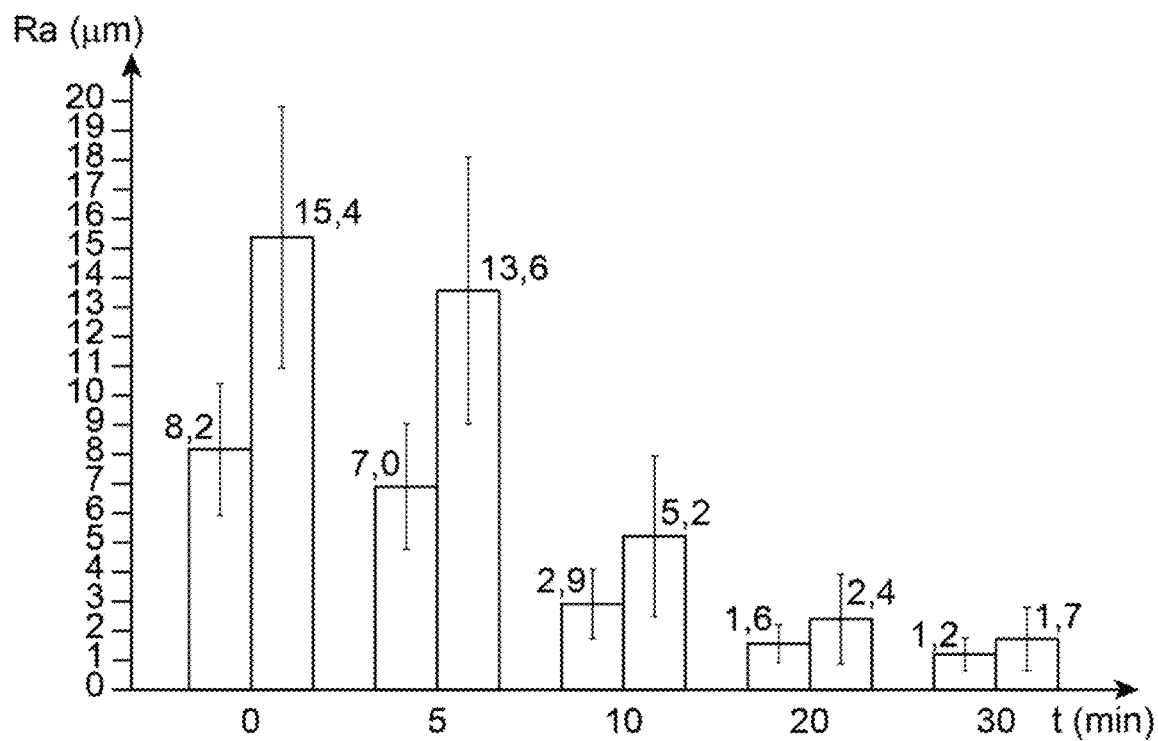
FIG. 2 is a graph illustrating, for example 1, the evolution of the roughness Ra (in μm) as a function of the treatment time t (in min, 0 min, 5 min, 10 min, 20 min and 30 min respectively).

The roughness was also measured as a function of the treatment time (0 min, 5 min, 10 min, 20 min and 30 min), the other operating parameters being those already mentioned above. The results are shown in the accompanying FIG. 2 attached, which is a graph illustrating the evolution of the roughness Ra (in μm) as a function of the treatment time t (0 min, 5 min, 10 min, 20 min and 30 min respectively). For each treatment period the left bar corresponds to the roughness of the first face and the right bar corresponds to the roughness of the second face.

It was found that the longer the treatment time the lower the roughness of the surface obtained. It is thus possible to adjust the treatment time according to the desired roughness.

Example 2

This example illustrates the implementation of the treatment method of the invention to demonstrate its effectiveness in encapsulating a conductive PEDOT:PSS layer in a polymer part based on polyamide 12.

The parts to be treated in this example consist of two polyamide 12 substrates having a rectangular form and the following dimensions: 30 mm*50 mm*5 mm (denoted S1 and S2 respectively).

Each of the substrates S1 and S2 is coated on the lower part of one face by spraying a layer of PEDOT:PSS (the upper part being left blank for reference), the quantity of polymer deposited being less on substrate S1 than on substrate S2.

Once the layer of polymer has been deposited, a secondary doping step in ethylene glycol was performed for 30 minutes to improve the electronic conductivity. Lastly, the two substrates were washed in ethanol before being dried at 120° C. for 30 minutes.

Figure 3:
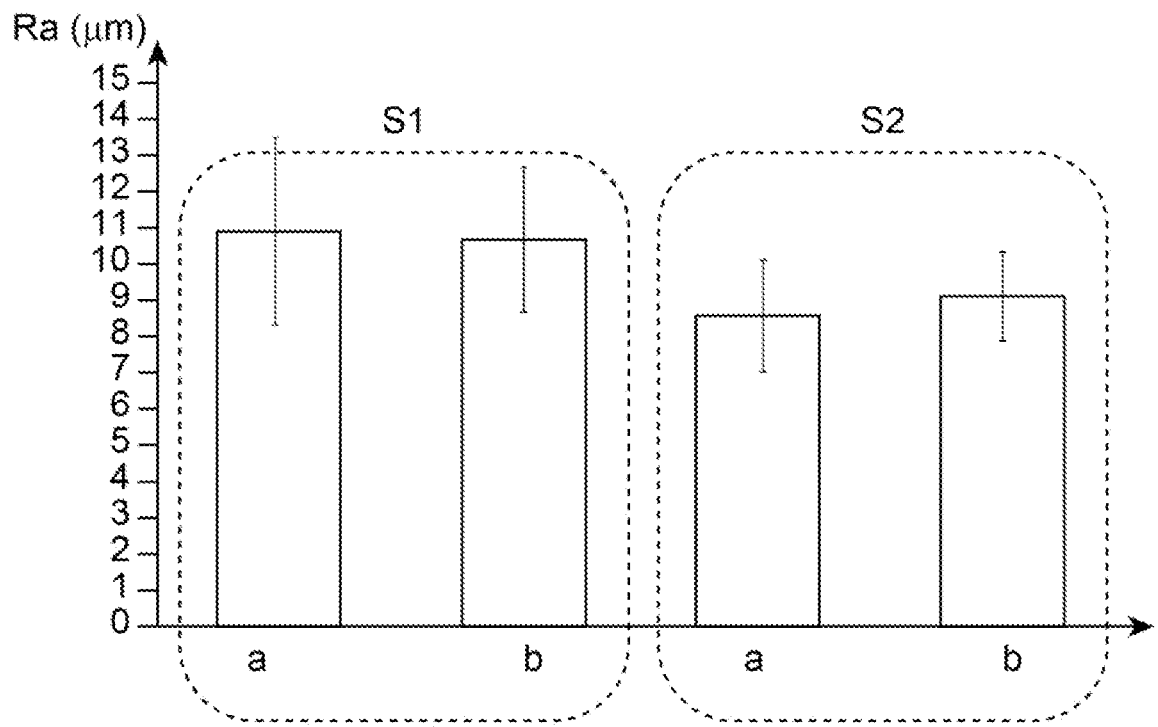
FIG. 3 is a graph illustrating, for example 2, the roughness Ra (in μm) for substrate S1 (lower part) before and after depositing (parts a) and b) respectively) and for substrate S2 (lower part) before and after depositing (parts a) and b) respectively).
Figure 4:
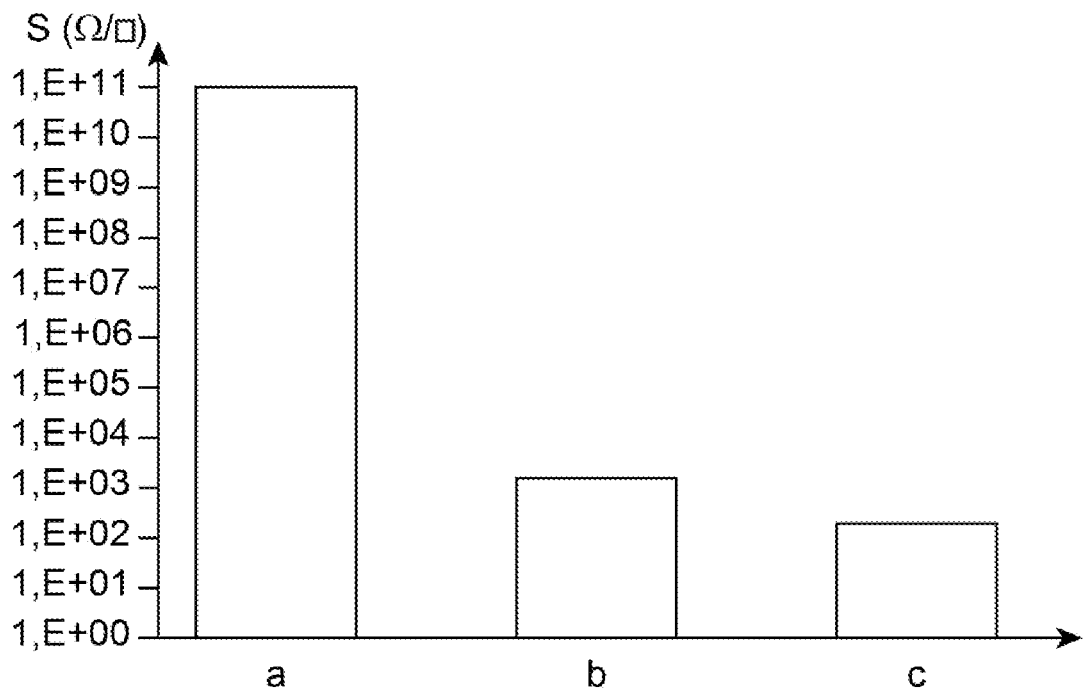
FIG. 4 is a graph illustrating, for example 2, the surface resistance S (in Ω/□) for substrates S1 and S2 before depositing (part a), for substrate S1 (lower part) after depositing (part b) and for substrate S2 (lower part) after depositing (part c).

The roughness and surface resistance measurements were carried out by using a mechanical profilometer and a 4-point probe respectively, the results being shown in:
FIG. 3, which is a graph illustrating the roughness Ra (in μm) for substrate S1 (lower part) before and after depositing (parts a) and b) respectively) and for the substrate S2 (lower part) before and after depositing (parts a) and b) respectively) but before the implementation of the treatment;
FIG. 4, which is a graph illustrating the surface resistance S (in $\Omega/\square$) for substrates S1 and S2 before depositing (part a), for substrate S1 (lower part) after depositing (part b) and for substrate S2 (lower part) after depositing (part c) but before treatment.

The Ra measurements are between 8 and 11 μm. The areas without PEDOT:PSS have high resistance (close to $10^{11} \Omega/\square$). The resistances obtained with the S1 and S2 substrates (lower parts) are between $10^3 \Omega/\square$ and $10^2 \Omega/\square$ respectively reflecting an electronically conductive layer.

The two substrates S1 and S2 are then subjected to a treatment according to the invention similar to the one described in example 1 below, except that the duration of exposure to the vapours is limited here to 10 minutes.

Figure 5:
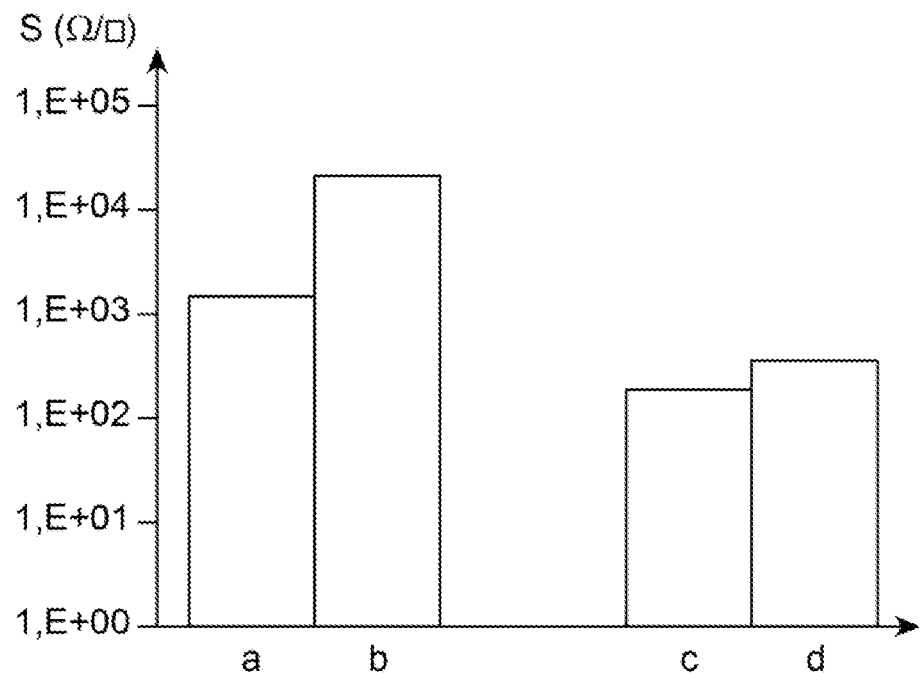
FIG. 5 is a graph illustrating, for example 2, the surface resistance S (in Ω/□) for substrate S1 (lower part) before and after treatment (parts a) and b) respectively) and for substrate S2 (lower part) before and after treatment (parts c) and d) respectively)
Figure 6:
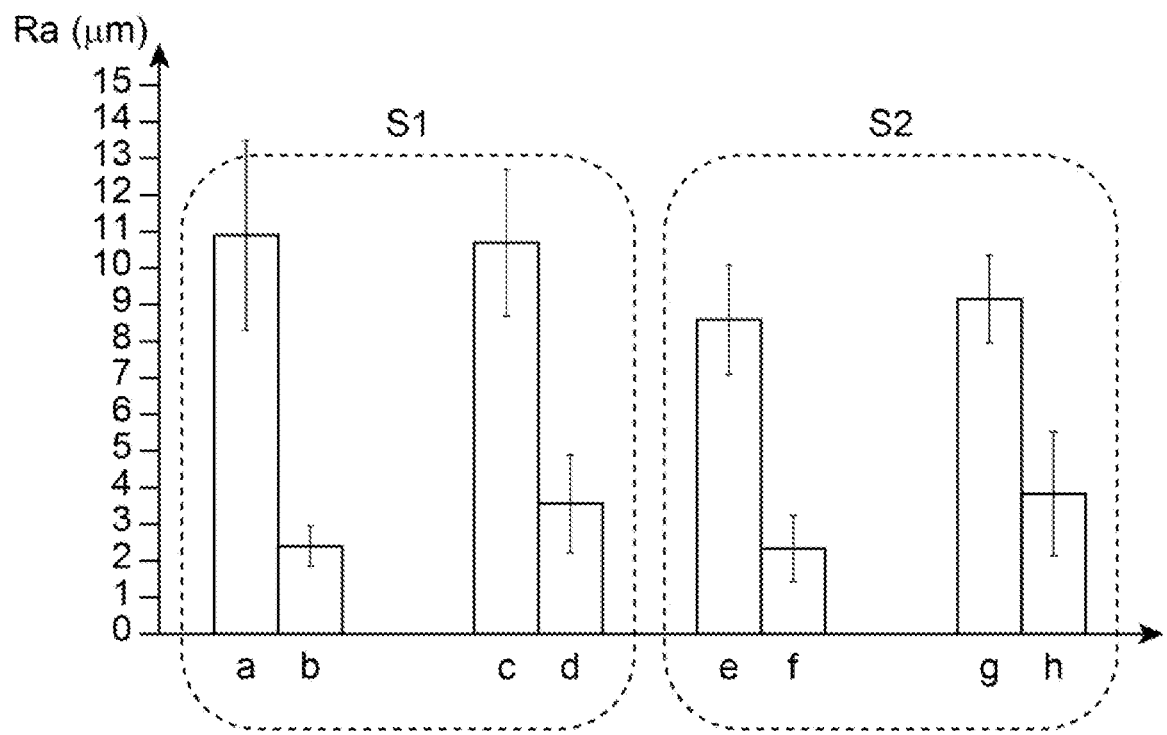
FIG. 6 is a graph illustrating, for example 2, the roughness Ra (in μm) for substrate S1 for the upper part before and after treatment (parts a) and b) respectively) and for the lower part before and after treatment (parts c) and d) respectively) and for substrate S2 for the upper part before and after treatment (parts e) and f) respectively) and for the lower part before and after treatment (parts g) and h) respectively).

At the end of this treatment, the measurements of surface resistance S and roughness Ra were repeated, the results being shown respectively in:
FIG. 5, which is a graph illustrating the surface resistance S (in $\Omega/\square$) for substrate S1 (lower part) before and after treatment (parts a) and b) respectively) and for substrate S2 (lower part) before and after treatment (parts c) and d) respectively);
FIG. 6, which is a graph illustrating the roughness Ra (in μm) of the substrate S1 for the upper part before and after treatment (parts a) and b) respectively) and for the lower part before and after treatment (parts c) and d) respectively) and for substrate S2 for the upper part before and after treatment (parts e) and f) respectively) and for the lower part before and after treatment (parts g) and h) respectively).

The main conclusions are as follows:
the treatment according to the invention reduces the roughness of the lower part and the upper part of each of the substrates;
the surface resistances remain below $10^5 \Omega/\square$ whether treated or not, which attests to the maintenance of electronic conductivity properties;
the surface resistance seems to increase slightly after the treatment according to the invention, which may attest to the fact that the polyamide 12 after solubilisation has reprecipitated on the surface of the conductor, which given the insulating nature of polyamide 12, induces an increase in surface resistance.

Regarding the roughness values achieved after the treatment, a treatment of 10 minutes results in an effectiveness of 75-80% for the layer of PA 12 alone (without PEDOT), whereas it is 55 to 70% for the layer of PA 12+PEDOT.

The effectiveness of the roughness is linked to the thickness of the layer of PEDOT (less effective for substrate S2 compared to substrate S1) (due to the lower permeation kinetics of the hexafluoroisopropanol vapour through the layer of PEDOT).

The chemical treatment of the present invention thus makes it possible to encapsulate the functional materials (electronic conductors in this case) while reducing the surface roughness.

Example 3

This example illustrates the implementation of the treatment method of the invention to demonstrate its effectiveness in functionalising polymer parts based on polyamide 12 with a view to improving their flame retardant properties while decreasing the roughness of the parts treated in this way.

The parts to be treated in this example are parallelepiped parts made of polyamide 12 and having the following dimensions: 127 mm*12.7 mm*5 mm.

On one of the faces of each of the parts a solution is sprayed comprising an organophosphorus monomer (bis[2-(methacryloyloxy)ethyl]phosphate), azobisisobutyronitrile (AiBN) (which acts as a radical initiator) and acetone.

Once the solution has been deposited, a heat treatment is carried out at 100° C. for a period of 12 hours, which allows the solution to polymerise on the surface of the parts and thus form a dense and stable layer on the surface of the parts.

The parts are then subjected to a treatment according to the invention similar to the one described in example 1 below, except that the duration of exposure to vapours is limited here to 10 minutes.

Figure 7:
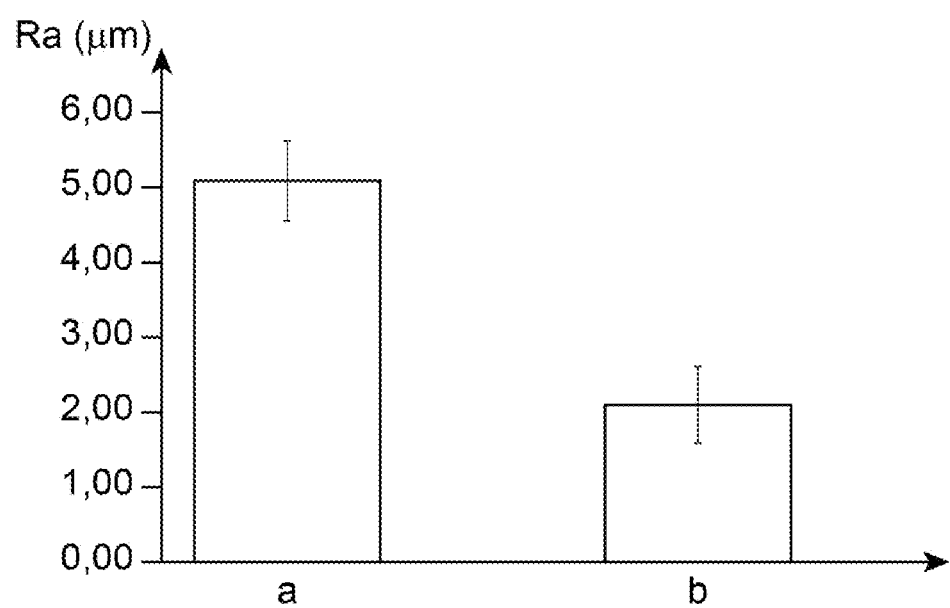
FIG. 7 is a graph illustrating, for example 3, the roughness Ra (in μm) for the control blanks (i.e. without a flame-retardant layer and not treated according to the method of the invention) and parts treated according to the method of the invention (parts a) and b) respectively).

After treatment, the roughness Ra is measured with a mechanical profilometer, the results being shown in FIG. 7, which illustrates the roughness Ra (in μm) for the control blanks (i.e. parts without a flame retardant layer and not treated according to the method of the invention) and parts treated according to the method of the invention (parties a) and b) respectively).

Thus, it was found that the treatment applied to previously treated fire-retardant parts reduced the Ra roughness of the parts by more than 60%. This results in roughnesses in the order of 2 μm.

The evaluation of the flame retardant behaviour of the treated parts is also performed according to standard UL94V0. In this case, a flame is applied to the vertically placed parts for 10 seconds. The residual combustion and afterglow time and the flow of flaming droplets from the sample are then assessed. Two ignitions are applied for this test. Five parts per condition (control blanks and parts treated according to this example) were tested.

While the blanks have flows of flaming droplets with each ignition, no combustion, incandescence, or flow of flaming droplets were observed for the fire-retardant and chemically polished treated parts (effectiveness of the fire-retardant property proven).

Furthermore, from the effect of the flammability test the blanks show a faded effect, whereas for the treated parts, the formation of a crust from the effect of the flame makes it possible to avoid any ignition or ignited flows (which attests to the effectiveness of the flame-retardant properties).

In conclusion, the treatment according to the invention carried out on PA 12 parts, previously treated with fire retardant by a deposit of polymer materials based on organophosphorus compounds, makes it possible to considerably reduce the surface roughness of the parts while retaining very good fire resistance.

The treatment according to the invention thus makes it possible to improve the adhesion of the functional materials (fireproof in this case) while reducing the surface roughness.

What is claimed is:

1. A method for treating a polymer part, which is a method for modifying the roughness of a surface of said polymer part and for functionalising said polymer part, comprising:
    a step of contacting the polymer part with vapours of solvent(s), capable of at least partly solubilising said polymer part, the contacting step being carried out under vacuum, and
    before the contacting step or after the contacting step, a step of depositing at least one functionalising material over all or part of the polymer part, the functionalising material(s) being electrically conductive polymers and/or organophosphorus polymers.

2. The treatment method according to claim 1, wherein the contacting step is performed at a residual pressure of 100 mbar to 200 mbar.

3. The treatment method according to claim 1, wherein the contacting step is performed at ambient temperature.

4. The treatment method according to claim 1, further comprising, after the contacting step, a step of stopping the exposure of the polymer part to the vapours of solvent(s).

5. The treatment method according to claim 1, comprising a step of eliminating the solvent(s) present in the polymer part obtained at the end of the contacting step.

6. The treatment method according to claim 5, wherein the eliminating step comprises:
    heating the polymer part to a temperature higher than a boiling temperature of the solvent(s); and/or
    subjecting the polymer part to a vacuum atmosphere.

7. The treatment method according to claim 1, wherein the polymer part comprises one or more polymers selected from polyamides, polyurethanes, polycarbonates, poly(meth) acrylates, polysulfones, polyolefins, styrenic polymers, polyethers, poly(meth)acrylics, polyoxazolines, polyacetates or mixtures thereof.

8. The treatment method according to claim 1, wherein the polymer part is based on a polyamide.

9. The treatment method according to claim 8, wherein the polyamide is polyamide 12.

10. The treatment method according to claim 1, wherein the solvent(s) are selected from halogenated solvents, aromatic solvents, ketonic solvents, alcoholic solvents, halogenated alcoholic solvents, acids or mixtures thereof.

11. The treatment method according to claim 1, wherein when the polymer part is based on polyamide 12 and the solvent is hexafluoroisopropanol.

12. The treatment method according to claim 1, wherein the solvent(s) are capable of solubilising the functionalising material(s).

* * * * *